United States Patent
Choi et al.

(10) Patent No.: US 10,996,910 B2
(45) Date of Patent: May 4, 2021

(54) DISPLAY APPARATUS AND CONTROL METHOD THEREOF

(71) Applicant: Samsung Electronics Co., Ltd., Suwon-si (KR)

(72) Inventors: Junsik Choi, Suwon-si (KR); Jina Kwon, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 43 days.

(21) Appl. No.: 16/580,394

(22) Filed: Sep. 24, 2019

(65) Prior Publication Data

US 2020/0379703 A1 Dec. 3, 2020

(30) Foreign Application Priority Data

May 28, 2019 (KR) .................. 10-2019-0062765

(51) Int. Cl.
*G06F 1/14* (2006.01)
*G06F 3/14* (2006.01)

(52) U.S. Cl.
CPC .................... *G06F 3/1423* (2013.01)

(58) Field of Classification Search
CPC ...... H04W 12/08; H04W 12/04; H04L 65/60; H04N 7/16; H04N 5/23219
See application file for complete search history.

(56) References Cited

U.S. PATENT DOCUMENTS 9,288,387 B1 * 3/2016 Keller ................. H04L 67/18
9,898,589 B2 2/2018 Walline et al.
2014/0025744 A1 * 1/2014 Kim ..................... G06F 3/1454
  709/204
2015/0106833 A1 4/2015 Kang et al.
2016/0110152 A1 * 4/2016 Choi ..................... G09G 5/006
  345/2.3
2019/0124394 A1 * 4/2019 Chandel ............... H04N 21/443

FOREIGN PATENT DOCUMENTS

| JP | 2006-101157 | 4/2006 |
| KR | 10-1702949 | 2/2017 |
| KR | 10-1756779 | 7/2017 |
| KR | 10-1784184 | 11/2017 |
| WO | 2019/146954 | 8/2019 |

OTHER PUBLICATIONS

International Search Report and Written Opinion of the International Searching Authority dated Feb. 26, 2020 in International Patent Application No. PCT/KR2019/012451.

* cited by examiner

*Primary Examiner* — Lixi C Simpson
(74) *Attorney, Agent, or Firm* — Staas & Halsey LLP

(57) ABSTRACT

A display apparatus includes a display; a communication circuit configured to communicate with a first external device or a second external device; a storage configured to store a list of a first content group designated to allow sharing by a first user of the first external device, a second content group designed to block sharing by the first user, a third content group designated to allow sharing by a second user of the second external device, and a fourth content group designated to block sharing by the second user; and a processor configured to: selectively process a content list based on detection of the first external device and detection of the second external device through the communication circuit.

18 Claims, 11 Drawing Sheets

DISPLAY APPARATUS AND CONTROL METHOD THEREOF

CROSS-REFERENCE TO RELATED APPLICATIONS

This application is based on and claims priority under 35 U.S.C. § 119 to Korean Patent Application No. 10-2019-0062765 filed on May 28, 2019 in the Korean Intellectual Property Office, the disclosure of which is incorporated by reference herein in its entirety.

BACKGROUND

1. Field

The present disclosure relates to a display apparatus for obtaining various kinds of content and displaying a content image on a screen based on the kinds and a method of controlling the same, and more particularly to a display apparatus, which controls access to various pieces of obtained content, and a method of controlling the same,

2. Description of the Related Art

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be actualized by a display apparatus that displays processed image data as an image on its own display panel. Further, the electronic apparatus is classified according to use methods into a stationary type to be installed in a certain place and a mobile type to be carriable by a user.

As a representative example of the display apparatus that is stationarily installed in a certain place at home, there is a television (TV). Based on installed forms and various other factors, the TV or the like display apparatus may play a central role in a system including various home appliances. For example, the TV can communicate with a server by accessing a wide area network (WAN) through an access point or a router, and communicate with various home appliances by accessing a local area network (LAN) at home through one-to-one direct communication. Through such various communication paths, the TV can obtain many kinds of content and display a content image based on the obtained content. In particular, with development of a mobile device such as a smartphone, a tablet computer, etc., many users are carrying personal mobile devices, and therefore a need for making the TV and the mobile device interwork with each other has increased.

As an example of interworking operation between the TV and the mobile device, content stored in the mobile device is wirelessly transmitted to the TV, and the TV may display an image based on the content received from the mobile device. A typical TV is designed to have a landscape screen having a horizontal length greater than a vertical length, and thus displays a broadcast image of a landscape mode with the minimum margin.

On the other hand, the mobile device is so small that a user can easily change a holding orientation, and thus content designed for the mobile device may be created in a portrait mode to have a vertical length greater than a horizontal length. When the content of the portrait mode is displayed on the TV having the screen of the landscape mode, a margin, i.e. an area where a content image is not displayed is relatively large.

While the TV is typically shared by users in a house, the mobile device is independently used by each individual user. The TV stores the content received from the mobile device in itself or in a cloud and is thus capable of accessing the content in the future. However, the content may be open to the public through the TV even when the content is private content of a specific user. Therefore, a typical TV may not protect the private content of each individual user from other users.

Meanwhile, user account login may be used to protect the private content of each individual user under a condition that the TV is shared by a plurality of users. However, such a method of using the user account login in terms of providing the content may be inconvenient for a user to remember and input account information.

SUMMARY

According to an embodiment of the disclosure of the present disclosure, there is provided a display apparatus including: a display; a communication circuit configured to communicate with a first external device or a second external device; a storage configured to store a list of a first content group designated to allow sharing by a first user of the first external device, a second content group designed to block sharing by the first user, a third content group designated to allow sharing by a second user of the second external device, and a fourth content group designated to block sharing by the second user; and a processor configured to: process a content list including the first content group and the second content group to be displayed based on detection of the first external device and no detection of the second external device through the communication circuit, process a content list including the third content group and the fourth content group to be displayed based on no detection of the first external device and detection of the second external device through the communication circuit, and process the content list including the first content group and the third content group to be displayed and the content list including the second content group and the fourth content group not to be displayed, based on detection of both the first external device and the second external device through the communication circuit.

Further, the communication circuit may be configured to detect the first external device or the second external device within a preset distance range, and perform connection for one-to-one wireless communication with the detected first external device or second external device.

Further, the communication circuit may comply with institutes of electrical and electronics engineers (IEEE) 802.15 standards.

Further, the processor may retrieve a designated state of the content from the list stored in the storage, based on a requesting instruction for a content list.

Further, the processor may process a message to be displayed to inform that the content list of the second content group and the fourth content group is not displayed.

Further, the processor may identify whether the first external device is detected through the communication circuit based on an activation instruction for a predetermined function provided in the display apparatus, and block activation of the function based on no detection of the first external device.

Further, the function may include a function of pivoting the display.

Further, the processor may identify a function of the display apparatus corresponding to an attribute of content, and activate the identified function when an image is displayed based on the content.

Further, each content of the first content group and the second content group may be obtained from the first external device, and each content of the third content group and the fourth content group may be obtained from the second external device.

According to an embodiment of the disclosure of the present disclosure, there is provided a method of controlling a display apparatus, including: storing a list of a first content group designated to allow sharing by a first user of the first external device, a second content group designed to block sharing by the first user, a third content group designated to allow sharing by a second user of the second external device, and a fourth content group designated to block sharing by the second user; displaying a content list including the first content group and the second content group based on detection of the first external device and no detection of the second external device through a communication circuit of the display apparatus; displaying a content list including the third content group and the fourth content group based on no detection of the first external device and detection of the second external device through the communication circuit; and processing the content list including the first content group and the third content group to be displayed and the content list including the second content group and the fourth content group not to be displayed, based on detection of both the first external device and the second external device through the communication circuit.

BRIEF DESCRIPTION OF THE DRAWINGS

The above and/or other aspects will become apparent and more readily appreciated from the following description of embodiments, taken in conjunction with the accompanying drawings, in which.

DETAILED DESCRIPTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
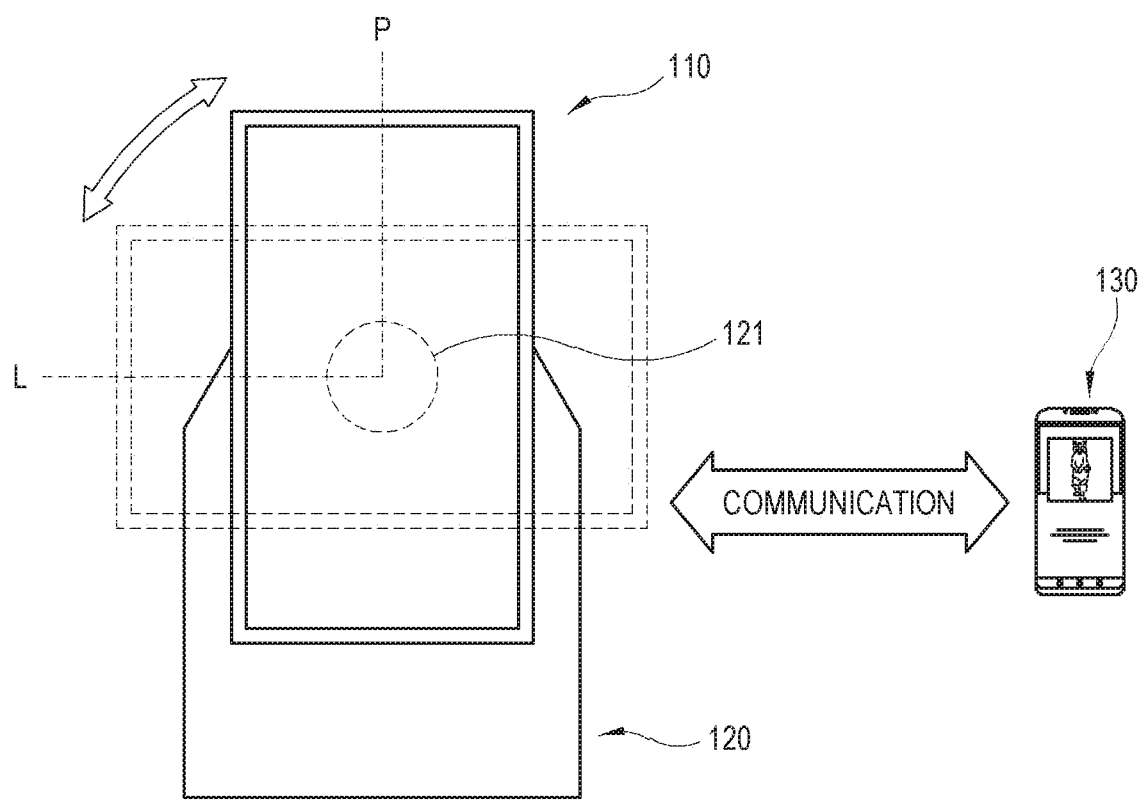
FIG. 1 illustrates an example of a display apparatus.

FIG. 1 illustrates an example of a display apparatus.

As shown in FIG. 1, a display apparatus 110 includes a processor configured to process predetermined content and a general device having a screen for displaying an image based on the processed content. The display apparatus 110 includes a stand 120 installed on a predetermined installation surface of the display apparatus 110, and is pivotally supported on one side of the stand 120. The stand 120 includes a motor 121 connected to the back of the display apparatus 110, and rotates the display apparatus 110 based on operation of the motor 121. Here, the operation of the motor 121 may be controlled based on a received control signal. The control signal transmitted to the motor 121 may be generated by a controller provided in the stand 120 or may be received from the display apparatus 110. Further, an instruction issued to generate the control signal may be given from the stand 120 or a remote controller of the display apparatus 110.

Alternatively, only a display panel forming a screen in the display apparatus may be designed to pivot. That is, elements such as a processor except the display panel may form a main body so that the display panel can pivot around the main body.

The display apparatus 110 may be provided to pivot around a center area of the screen for displaying an image. The display apparatus 110 may at least pivot between a position P and a position L. The display apparatus 110 enters a portrait mode having a vertical length longer than a horizontal length at the position P, and a landscape mode having a horizontal length longer than a vertical length at the position L.

An image or user interface (UI) displayed on the display apparatus 110 may correspond to one of the portrait mode and the landscape mode. Of course, the display apparatus 110 may display a landscape image in the portrait mode, or may display a portrait image in the landscape mode. However, in this case, the screen does not match the image in light of a ratio of the horizontal length and the vertical length. That is, in this case, an area, in which an image is not displayed, i.e. a margin is relatively increased on the screen of the display apparatus 110. Further, a UI or image may be designed to match the landscape mode or the portrait mode. Therefore, the portrait image may be displayed in the portrait mode, and the landscape image may be displayed in the landscape mode.

Meanwhile, the display apparatus 110 can wirelessly communicate with one or more external devices such as a mobile device 130. The display apparatus 110 can access both a wide area network (WAN) and a local area network (LAN), and may for example perform communication with the mobile device 130 based on W-Fi through an access point (AP), and direct-communication with the mobile device 130 based on Bluetooth low energy (BLE). Further, the display apparatus 110 may access a server or a cloud through the AP.

Through such a communication path, the display apparatus 110 may receive predetermined content from the mobile device 130 or the server. When the mobile device 130 is connected to the AP, the display apparatus 110 may receive content from the mobile device 130 through the WAN. Alternatively, the mobile device 130 may store content in a predetermined user account of the server or the cloud, and the display apparatus 110 logging in the corresponding user account may receive the content from the server or the cloud. Alternatively, the display apparatus 110 may directly receive content from the mobile device 130. The display apparatus 110 processes the received content and displays the content image.

When the display apparatus 110 is shared by many users like a TV at home or an organization, the display apparatus 110 may receive content from the mobile devices 130 of a plurality of users as well as the mobile device 130 of one user. The display apparatus 110 may process the content obtained from each mobile device 130 and reproduce content without restrictions to be provided to any user, thereby displaying a content image.

Alternatively, the display apparatus 110 may selectively restrict the reproduction of the content so as to prevent specific content designated for a certain user from being provided to other users. Such operation may be important in privacy of a user or security of content under a condition that the display apparatus 110 used as a shared apparatus is allowed to access various pieces of content. In this regard, descriptions will be made later.

Meanwhile, a term "content" is not limited to a certain kind of data, and all the kinds of data to be processed by and displayed as an image by the display apparatus 110 may be regarded as content. For example, the content may be given in units of data to be executed by a specified application like library data, document data, a multimedia data file of a moving image, a still image, a picture, an audio file, etc. Alternatively, the content may include a game program, a media playing program, a program for executing certain library data or a program code, and the like application. Alternatively, the content may include a multimedia stream being streamed from a streaming server, or a broadcast signal corresponding a plurality of broadcast channels. Alternatively, the content may include a web service provided by a server. Like this, various pieces of content may be used in this embodiment.

Figure 2:
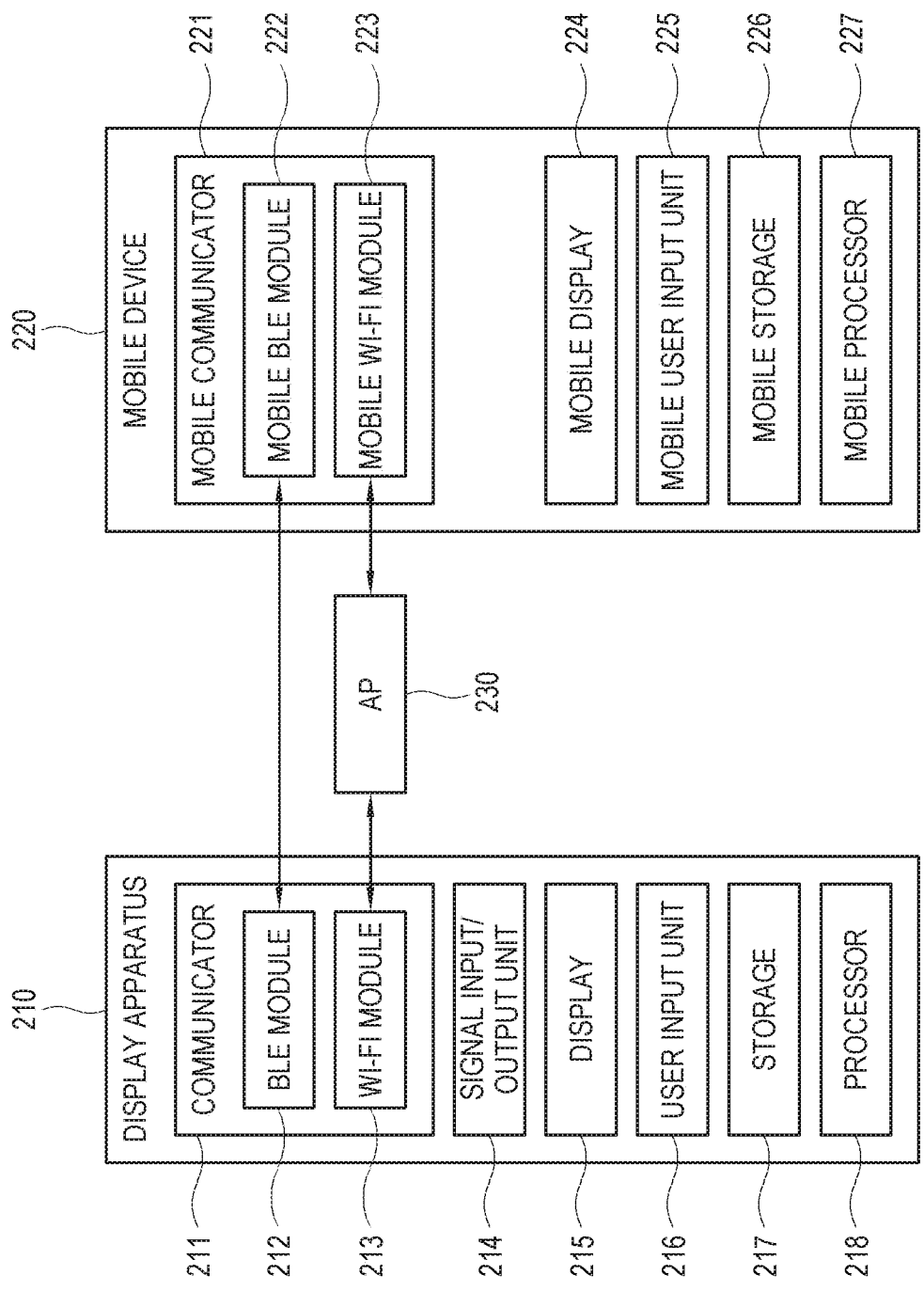
FIG. 2 is a block diagram of a display apparatus and a mobile device.

FIG. 2 is a block diagram of a display apparatus and a mobile device.

As shown in FIG. 2, a display apparatus 210 includes a communicator 211, a signal input/output section 214, a display 215, a user input section 216, a storage 217, and a processor 218. The mobile device 220 includes a mobile communicator 221, a mobile display 224, a mobile user input section 225, a mobile storage 226, and a mobile processor 227.

Below, configuration of the display apparatus 210 will be described.

The communicator 211 refers to an interactive communication circuit that includes at least one of elements, such as communication modules, communication chips, etc. corresponding to various wired and wireless communication protocols. The communicator 211 supports a plurality of wireless communication standards, and includes a communication circuit, a communication chip, or a communication module to carry out communication based on each of the wireless communication standards.

The communicator 211 includes a first communication circuit 212 for one-to-one local communication, and a second communication circuit 213 for WAN-based communication. For example, the communication standards for the first communication circuit 212 may include Bluetooth or BLE based on institutes of electrical and electronics engineers (IEEE) 802.15 standards, and the communication standards for the second communication circuit 213 may include WLAN communication or Wi-Fi based on IEEE 802.11 standards.

In this embodiment, the first communication circuit 212 includes a BLE module 212 to perform BLE communication. The second communication circuit 213 includes a W-Fi module 213 to perform W-Fi communication. The W-Fi module 213 can access the WAN through an AP 230, and communicate with the mobile device 220 or the server. However, the foregoing communication standards for the first communication circuit 212 and the second communication circuit 213 are merely an example, and the first communication circuit 212 and the second communication circuit 213 may have various communication standards.

The signal input/output unit 214 is one-to-one or one-to-many connected to a predetermined external device such as a set-top box or an optical media player, thereby receiving or outputting data with regard to the corresponding external device. The signal input/output unit 214 may for example include a high definition multimedia interface (HDMI) port, a display port, a universal serial bus (USB) port, and the like connector or port based on preset protocols.

The display 215 includes a display panel capable of displaying an image on a screen. The display panel is provided to have a light receiving structure such as a liquid crystal type, or a self-emissive structure such as an organic light emitting diode (OLED) type. The display 215 may include an additional element according to the structures of the display panel. For example, when the display panel is the liquid crystal type, the display 215 includes a liquid crystal display panel, a backlight unit configured to emit light, and a panel driving substrate configured to drive liquid crystal of the liquid crystal display panel.

The user input section 216 includes circuits related to various input interfaces through which a user can make an input. The user input section 216 may be variously configured according to the kinds of display apparatus 210, and may for example include mechanical or electronic buttons of the display apparatus 210, a remote controller separated from the display apparatus 210, a touch pad, a touch screen provided on the display 215, etc.

The storage 217 is accessed by the processor 218, and performs operations such as reading, recording, modifying, deleting, updating, etc. for data under control of the processor 218. The storage 217 includes a flash memory, a hard disk drive (HDD), a solid state drive (SSD), a read only memory (ROM), and the like nonvolatile memory in which data is retained regardless of whether power is supplied or not; and a buffer, a random access memory (RAM) and the like volatile memory to which processing data is loaded.

The processor 218 includes one or more hardware processors achieved by a central processing unit (CPU), a chipset, a buffer, circuit, etc. which are mounted on a printed circuit board (PCB). Alternatively, the processor 218 may be designed as a system on chip (SoC). The processor 218 include modules corresponding to various processes, such as a demultiplexer, a decoder, a scaler, an audio digital signal processor (DSP), an amplifier, etc. to process an image. Here, some or all of the modules may be achieved by the SoC. For example, a demultiplexer, a decoder, a scaler, and the like module related to an image process may be achieved as an image processing SoC, and an audio DSP may be achieved as a chipset separated from the SoC. Further, as one of design examples, when the display apparatus 200 is designed to be pivotable by the motor of the stand, the processor 218 may be electrically connected to the motor so that a control signal for driving the motor can be applied to the motor.

Below, configuration of the mobile device 220 will be described.

The mobile communicator 221 refers to an interactive communication circuit that includes at least one of elements, such as communication modules, communication chips, etc. corresponding to various wired and wireless communication protocols. The mobile communicator 221 includes a mobile BLE module 222 for BLE-based wireless communication, and a mobile W-Fi module 223 for W-Fi-based wireless communication.

The mobile display 224 displays an image based on an image signal processed by the mobile processor 227.

The mobile user input section 225 includes circuits related to various input interfaces through which a user can make an input. For example, the mobile user input section 225 may include physical buttons provided in the mobile device 220, a touch screen structure provided in the mobile display 224, etc.

The mobile storage 226 performs operations such as reading, recording, modifying, deleting, updating, etc. for data by the mobile processor 227. The mobile storage 226 includes various nonvolatile and volatile memories such as a flash memory, an HDD, an SSD, a buffer, a RAM, etc.

The mobile processor 227 includes one or more hardware processors achieved by a CPU, a chipset, a buffer, circuit, etc. which are mounted on a PCB. Alternatively, the mobile processor 227 may be designed as a SoC. The mobile processor 227 may execute an operating system (OS) and various applications in the mobile device 220. The mobile processor 227 may transmit content data stored in the mobile storage 226 to the display apparatus 210. Further, the mobile processor 227 not only reproduces content but also transmits the content to the display apparatus 210, thereby carrying out mirroring operation in which the same content are reproduced by both the display apparatus 210 and the mobile device 220.

With this structure, the processor 218 of the display apparatus 210 operates as follows.

Figure 3:
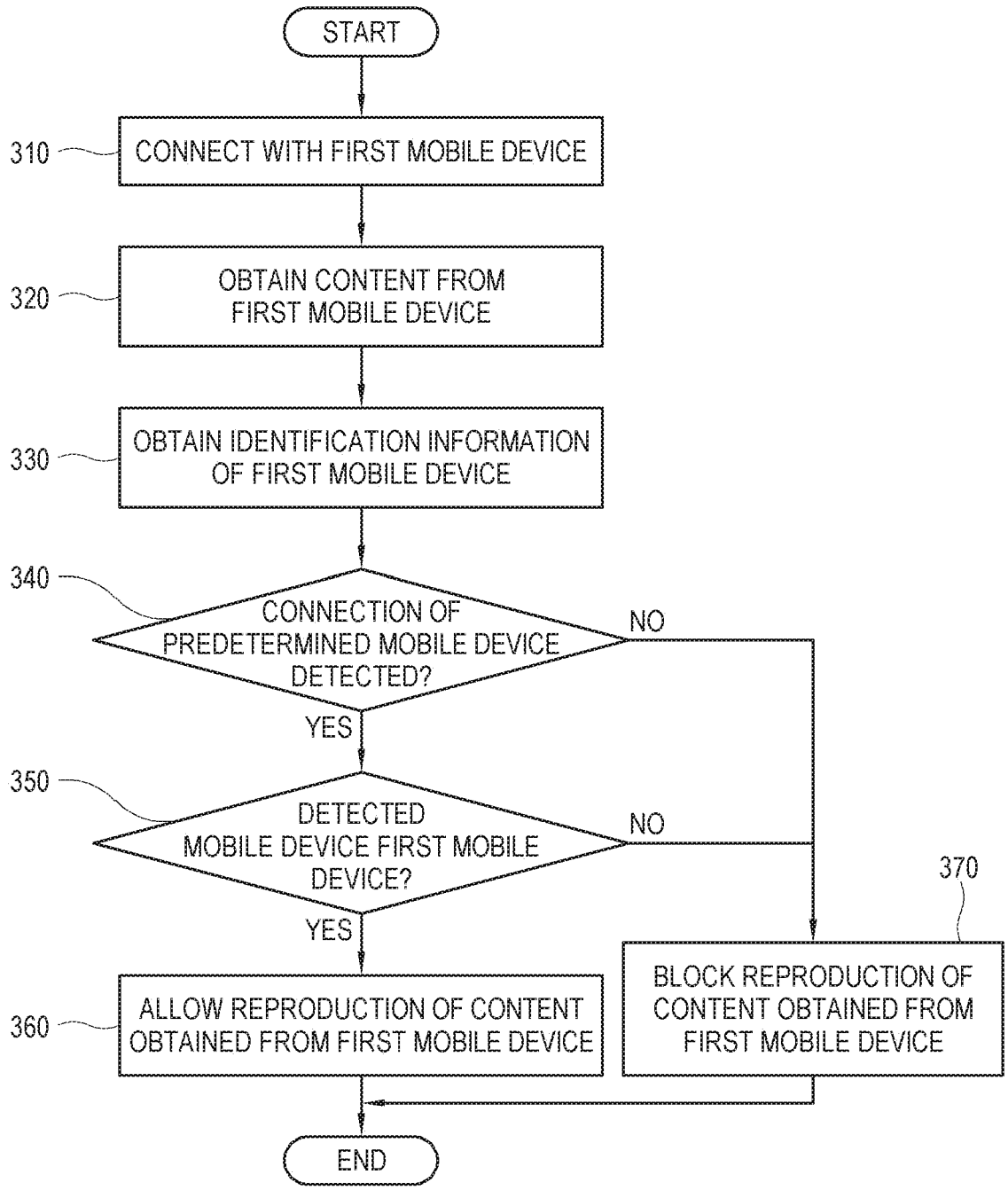
FIG. 3 is a flowchart showing a method of controlling a display apparatus.

FIG. 3 is a flowchart showing a method of controlling a display apparatus.

As shown in FIG. 3, the following operation is carried out by the processor of the display apparatus.

At operation 310 the display apparatus is connected to and communicates with the first mobile device.

At operation 320 the display apparatus obtains content from the connected first mobile device. The display apparatus may obtain content from the built-in storage, the server, the cloud, etc. besides the mobile device. However, this embodiment will describe a case that the content is obtained from the mobile device. The other cases will be described later.

At operation 330 the display apparatus obtains identification information about the connected first mobile device. There are no limits to the form of the identification information about the first mobile device, and the form of the identification information may be variously designed as long as the display apparatus can identify a desired one among many mobile devices or many pieces of content. The examples of the identification information will be described later.

At operation 340 the display apparatus identifies whether communication connection of a predetermined mobile device is detected. Here, the detected communication connection includes communication connection based on short-range one-to-one communication standards such as BLE. When the communication connection with the mobile device is not detected, the display apparatus enters operation 370.

When the communication connection with the mobile device is detected, at operation 350 the display apparatus identifies whether the detected mobile device is the first mobile device. For example, to perform the identification of the operation 350, the display apparatus compares the identification information of the detected mobile device with the identification information of the first mobile device previously obtained and stored in the operation 330.

When the detected mobile device is identified as the first mobile device, at operation 360 the display apparatus allows reproduction of the content corresponding to the first mobile device, i.e. content previously obtained from the first mobile device in the operation S320. That is, in this case, the display apparatus processes the content to be reproduced when a user makes an input to reproduce the content. Here, the content may also be identified by identification information. In this regard, descriptions will be made later.

On the other hand, when the detected mobile device is identified as not the first mobile device but the second mobile device, at operation 370 the display apparatus blocks the reproduction of the content corresponding to the first mobile device. That is, in this case, the display apparatus processes the content to be not reproduced even when a user makes an input to reproduce the content.

Meanwhile, the operation in this embodiment may be carried out when the display apparatus receives an instruction issued to reproduce content. In this case, when the first mobile device is detected, the display apparatus processes the corresponding content to display the content image. On the other hand, when the first mobile device is not detected, the display apparatus may not display a content image of the corresponding content or blocks the display of the content image.

With this method, the display apparatus according to this embodiment blocks the reproduction of the content obtained from the first mobile device when a user is not near the display apparatus, i.e. it is identified that the first mobile device is not present in the vicinity of the display apparatus. Therefore, when a user of the first mobile device is absent, the display apparatus prevents another user from viewing the content of the first mobile device. In result, the display apparatus prevents the content from being inadequately opened or leaked to the public, and improves the security of the content.

In this embodiment, the display apparatus identifies the content obtained from the first mobile device as the content corresponding to the first mobile device. However, the content corresponding to the first mobile device is not necessarily limited to the content obtained from the first mobile device. Although content is obtained from not the first mobile device but the server or the like separate device, the display apparatus may identify the obtained content as the content of the first mobile device based on the identification information. Below, such an embodiment will be described.

Figure 4:
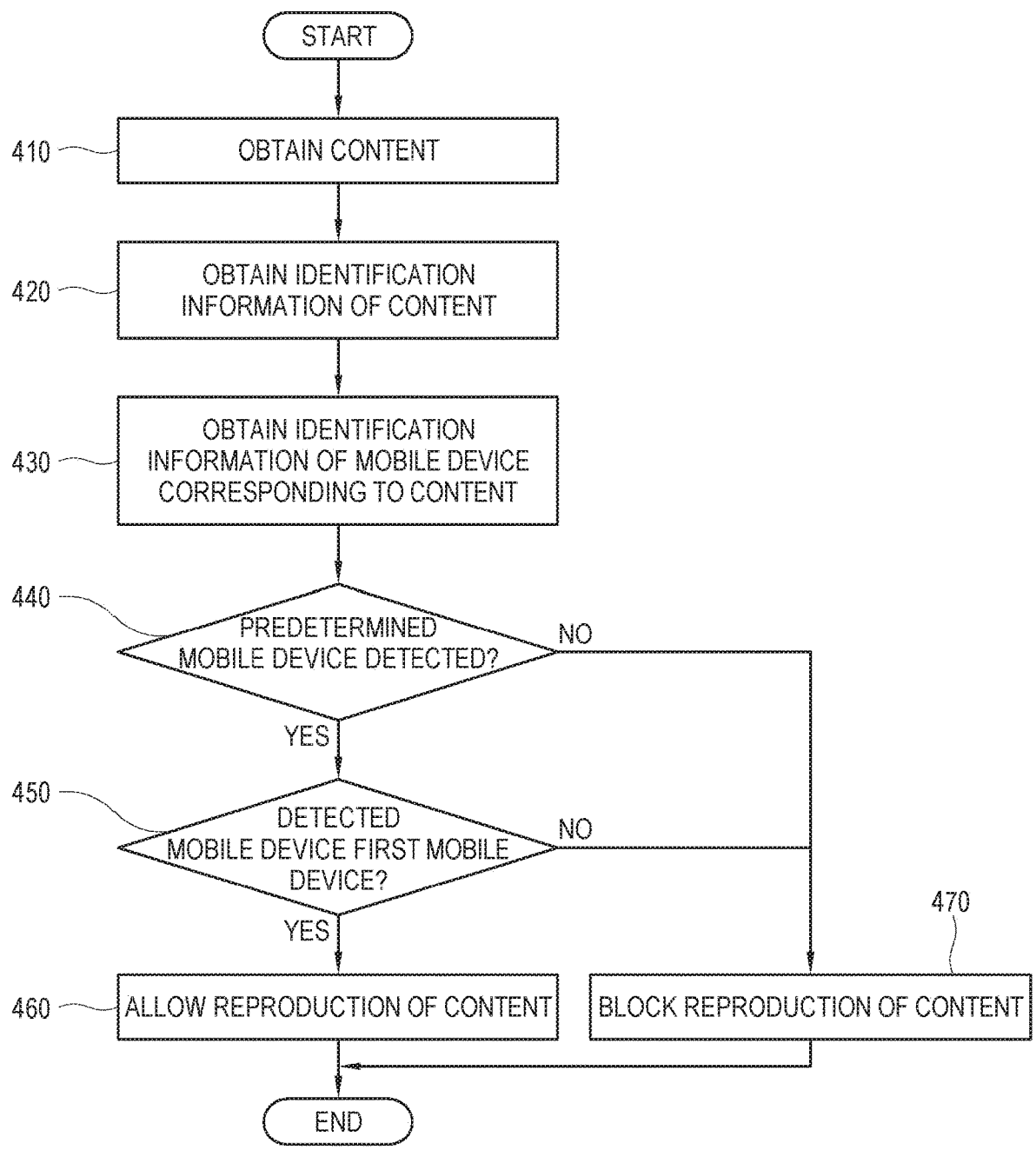
FIG. 4 is a flowchart showing a method of controlling a display apparatus.

FIG. 4 is a flowchart showing a method of controlling a display apparatus;

As shown in FIG. 4, the following operation is performed by the processor of the display apparatus.

At operation 410 the display apparatus obtains content. The display apparatus may for example obtain content from the server or the like external device.

At operation 420 the display apparatus obtains the identification information about the corresponding content. The identification information about the corresponding content may be included in metadata, or may be designated for the corresponding content by the display apparatus.

At operation 430 the display apparatus obtains the identification information of the mobile device corresponding to the content. For example, when the display apparatus obtains the content through a certain user account, the display apparatus may obtain the identification information of the mobile device previously registered to the corresponding user account. In this regard, descriptions will be made later.

At operation 440 the display apparatus identifies whether communication connection of a predetermined mobile device is detected. When the communication connection with the mobile device is not detected, the display apparatus enters operation 470.

When the communication connection with the mobile device is detected, at operation 450 the display apparatus identifies whether the detected mobile device is a previously designated mobile device, for example, the first mobile device.

When it is identified that the detected mobile device is the first mobile device, at operation 460 the display apparatus allows the corresponding content to be reproduced when the content corresponding to the first mobile device, i.e. the content previously obtained in the operation 410 is requested to be reproduced.

On the other hand, when it is identified that the detected mobile device is not the first mobile device but a separate second mobile device, at operation 470 the display apparatus blocks reproduction of the corresponding content even when the content corresponding to the first mobile device is requested to be reproduced.

The identification information of the content and the identification information of the mobile device may be variously designed as long as they are distinguishable by the display apparatus. Below, examples of the identification information will be described.

Figure 5:
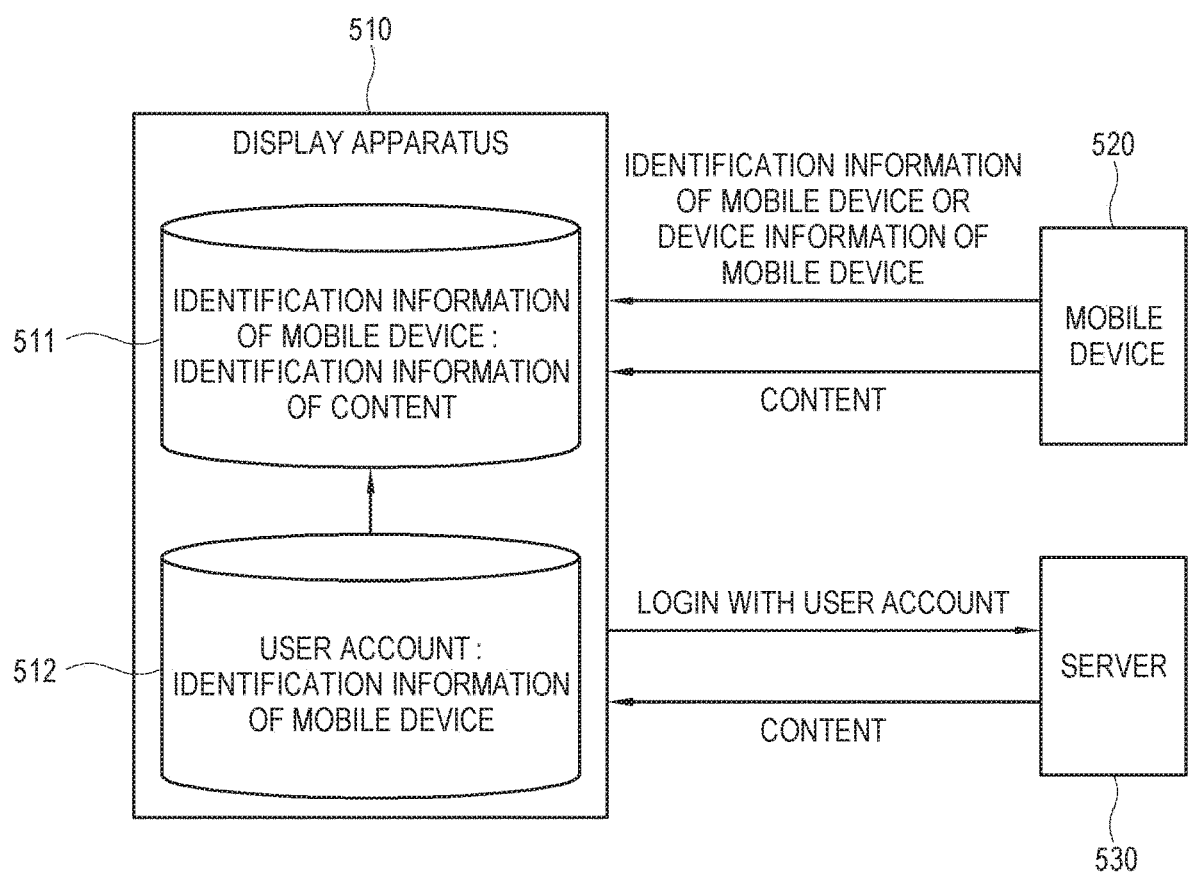
FIG. 5 illustrates an example of identification information obtained by a display apparatus and a method of obtaining identification information of a mobile device.

FIG. 5 illustrates an example of identification information obtained by a display apparatus and a method of obtaining identification information of a mobile device.

As shown in FIG. 5, a display apparatus 510 can communicate with a mobile device 520 or a server 530. The display apparatus 510 may obtain the identification information of the mobile device 520 from the mobile device 520 during the communication connection with the mobile device 520. The identification information of the mobile device 520 may include unique device identification (ID) of the mobile device 520 registered in the register or ROM Of the mobile device 520, or device ID generated based on an algorithm previously set by the mobile device 520. The device ID may for example be achieved by combination of a user account of the mobile device 520, device information about device characteristics of the mobile device 520 (for example, a model name, a media access control (MAC) address, etc. of the mobile device 520), etc.

Alternatively, even though the identification information is not obtained from the mobile device 520, the display apparatus 510 may give voluntary device ID to the mobile device 520 when pairing with the mobile device 520 is performed for the communication connection. Alternatively, the display apparatus 510 may generate device ID along an algorithm previously set based on device information obtained from the mobile device 520.

In other words, the display apparatus 510 may directly obtain the identification information from the mobile device 520, may generate identification information based on device information obtained from the mobile device 520, or may voluntarily give identification information to the paired mobile device 520. Therefore, the display apparatus 510 can obtain the identification information of the mobile device 520 connected for the communication.

For convenience, the operation that the display apparatus 510 voluntarily gives identification information to the mobile device 520 will be called authentication. In this case, the display apparatus 510 may authenticate any detected mobile device 520 without limitations. Alternatively, the display apparatus 510 may authenticate only the mobile devices 520 of previously registered models, types or manufacturers. Alternatively, the display apparatus 510 may authenticate only the mobile device 520 which has been detected more than or equal to a predetermined number of times.

When the display apparatus 510 receives content from identifiable mobile device 520, it may be identified that the corresponding content matches the mobile device 520. The identification information of the content may be obtained from the metal data of the content, generated by the display apparatus 510 based on the metadata of the content, or voluntarily given by the display apparatus 510.

The display apparatus 510 registers such obtained identification information of the mobile device 520 and the identification information of the corresponding content in a database (DB) 511. Thus, when the display apparatus 520 receives a request for reproducing the content, the display apparatus 520 can identify which mobile device 520 matches the corresponding content, by searching the DB 511.

Meanwhile, the display apparatus 510 may obtain content from not the mobile device 520 but a separate device, e.g. the server 530. When the display apparatus 510 obtains content stored with a predetermined user account, the display apparatus 510 searches a DB 512 in which the user account and the identification information of the corresponding mobile device 520 are registered, thereby finding the identification information of the mobile device 520 corresponding to the user account from which the content is obtained. With this method, the display apparatus 510 obtains the identification information of the content and the identification information of the mobile device 520 and registers the obtained identification information in the DB 511.

Below, a screen mode of the display apparatus 510 will be described according to conditions based on operation.

Figure 6:
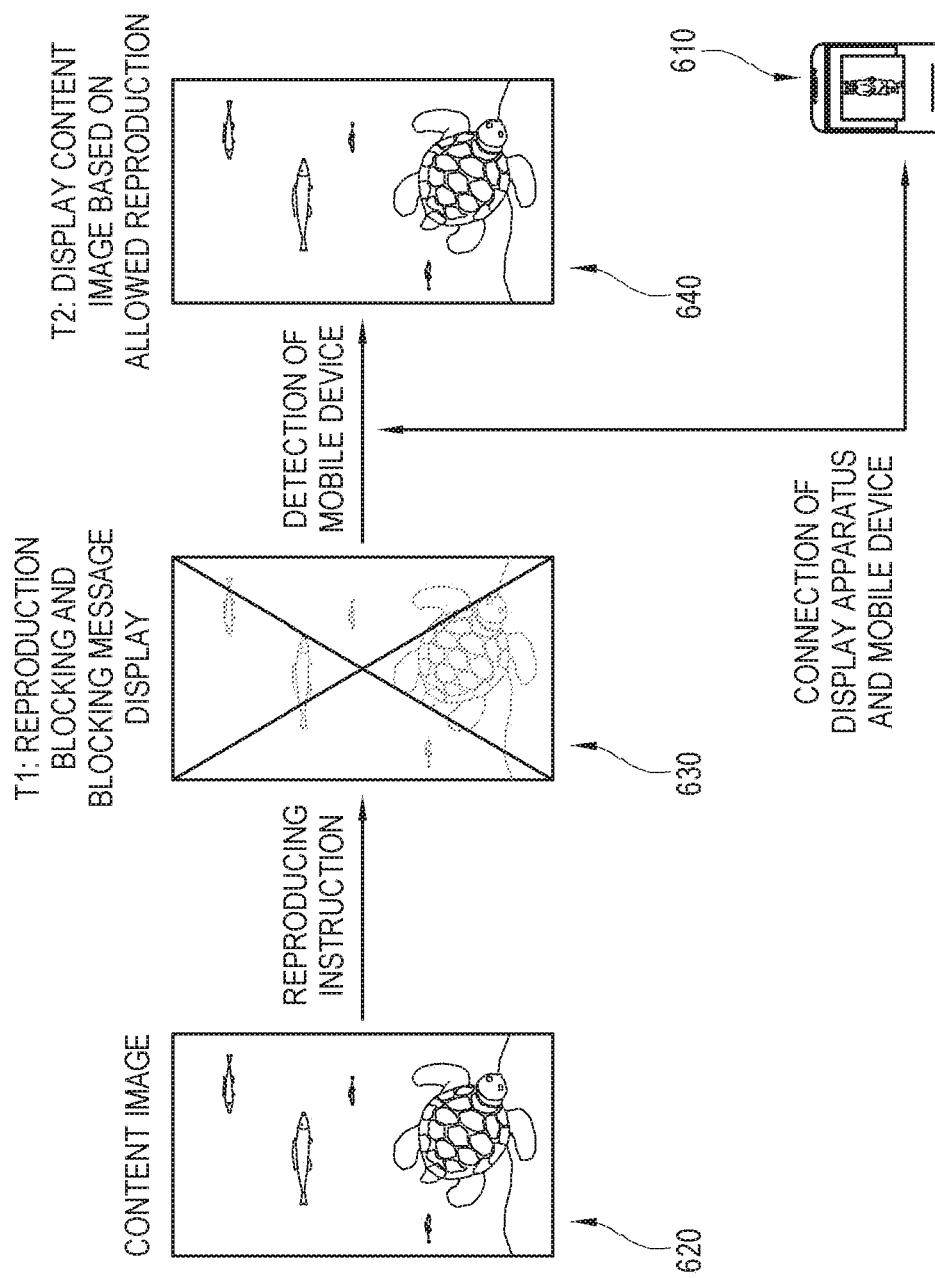
FIG. 6 illustrates an example of showing a screen mode of a display apparatus based on a content allowing or blocking condition.

FIG. 6 illustrates an example of showing a screen mode of a display apparatus based on a content allowing or blocking condition.

As shown in FIG. 6, when a user issues an instruction to reproduce content, the display apparatus obtains content corresponding to the instruction. When this content is normally reproduced, the content image is displayed like a screen 620.

In response to the instruction issued to reproduce the content, the display apparatus identifies whether a mobile device 610 corresponding to the content is detected as it is connectable for the communication. For example, when the display apparatus is provided to perform BLE-based communication with the mobile device 610, and the mobile device 610 is placed within a range of about 10 meters from the display apparatus, the communication between the display apparatus and the mobile device 610 is possible. When the mobile device 610 is detected within a communication-allowable range, the display apparatus performs pairing with the mobile device 610, thereby performing the BLE-based communication with the mobile device 610.

When the mobile device 610 corresponding to the content is not detected at a point in time T1, the display apparatus blocks the reproduction of the obtained content. While blocking the reproduction of the content, the display apparatus displays an image 630 with a message informing that the reproduction of the content is blocked or the access to the content is restricted. The image 630 may be displayed by various methods. The display apparatus may display a pop-up message on a paused screen of the content image, or may display only the message on the screen.

Meanwhile, when an instruction issued to reproduce content is received, or when the reproduction of the content is blocked at the point in time T1, the display apparatus may newly detect a mobile device 610. The display apparatus obtains the identification information of the mobile device 610 while performing the communication connection with the detected mobile device 610, and identifies whether the detected mobile device 610 matches the content. When it is identified that the detected mobile device 610 does not match the content, the display apparatus blocks the reproduction of the content like that at the point in time T1.

On the other hand, when it is identified that the detected mobile device 610 matches the content, the display apparatus allows the content to be reproduced at a point in time T2, and processes the content so that a content image 640 can be displayed on the screen.

Meanwhile, in the foregoing embodiment, the display apparatus selectively restricts the reproduction of the content according to whether the mobile device corresponding to the content is detected. However, the selective restriction of the display apparatus based on the detection of the mobile device may be applied to a device function as well as the content. Below, an embodiment, in which the display apparatus selectively changes an instructed function according to whether the mobile device is detected, will be described.

Figure 7:
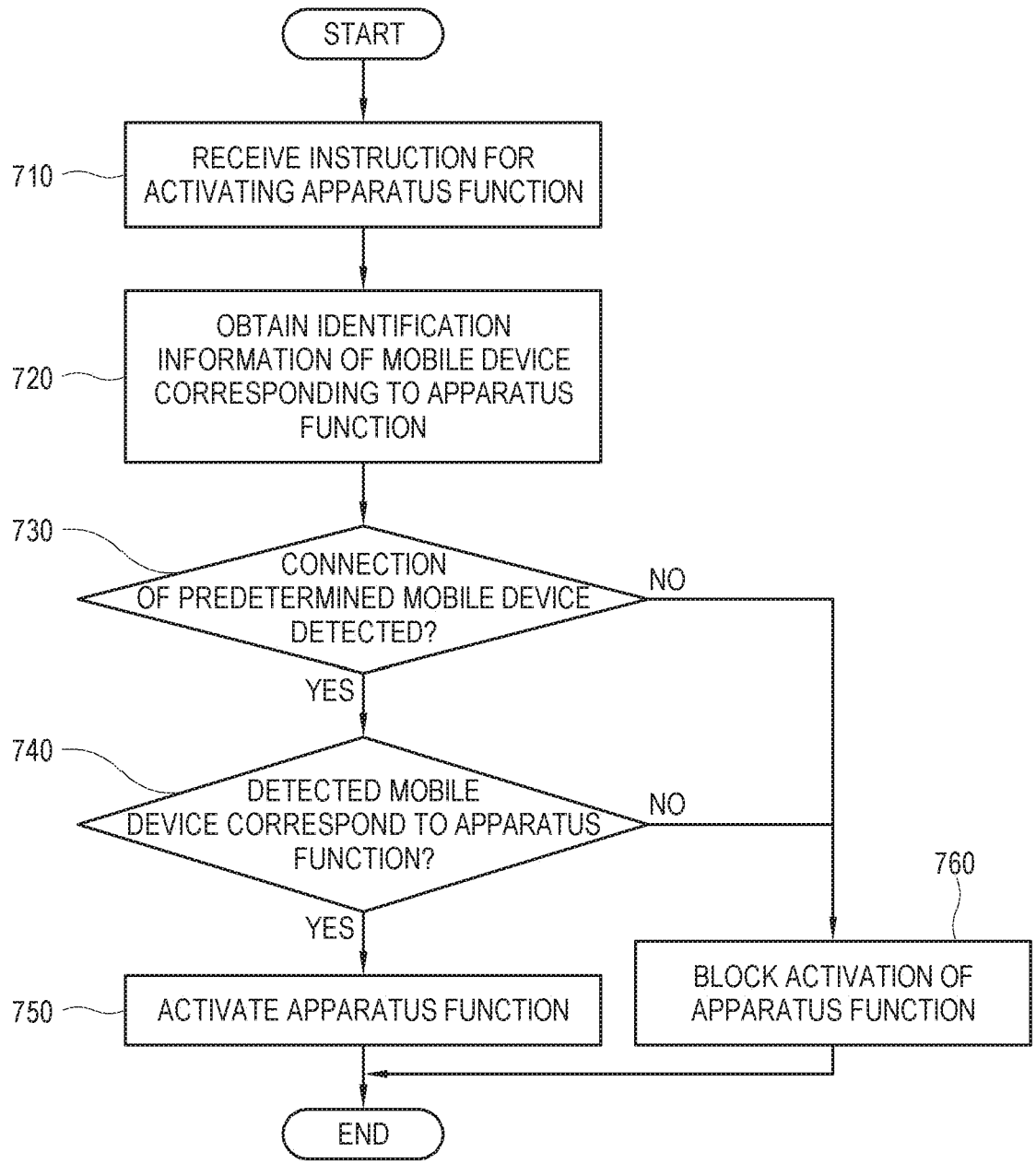
FIG. 7 is a flowchart showing a method of controlling a display apparatus.

FIG. 7 is a flowchart showing a method of controlling a display apparatus.

As shown in FIG. 7, the following operation of the display apparatus is carried out by the processor.

At operation 710 the display apparatus receives an instruction issued by a user to activate an apparatus function.

The apparatus function may include various functions of the display apparatus, such as screen pivoting, external port activation, connection with an external device, voice recognition, etc. of the display apparatus. For example, the display apparatus may receive a user input and instructed to pivot the screen.

At operation 720 the display apparatus may obtain the identification information of the mobile device corresponding to the instructed apparatus function. Thus, the display apparatus can identify the corresponding mobile device when the corresponding mobile device is detected.

At operation 730 the display apparatus identifies whether communication connection with a predetermined mobile device is detected. When the communication connection with the mobile device is not detected, the display apparatus enters operation 760.

When the communication connection with the mobile device is detected, at operation 740 the display apparatus identifies whether the detected mobile device corresponds to the apparatus function desired to be activated. For example, the display apparatus may be previously designated to switch from a default mode, i.e. the portrait mode over to the landscape mode in response to a switching instruction only when a specific mobile device is detected.

When the detected mobile device matches the corresponding apparatus function, at operation 750 the display apparatus activates the apparatus function. For example, the display apparatus may pivot the screen to switch over from the portrait mode to the landscape mode in response to the instruction.

On the other hand, when the detected mobile device does not match the corresponding apparatus function, at operation 760 the display apparatus blocks the activation of the apparatus function. For example, the display apparatus does not pivot the screen but maintains the screen in the current mode. In addition, the display apparatus may display a message, which informs that the activation of the instructed apparatus function is blocked, on the screen.

Thus, the display apparatus can selectively restrict the activation of the apparatus function according to whether the mobile device is detected.

Meanwhile, the screen pivoting in the display apparatus may be related to an attribute of the content.

For example, when content is an image of the landscape mode and the display apparatus is in the portrait mode, a content image is largely displayed when the display apparatus is switched over from the portrait mode to the landscape mode. Alternatively, when content is a UI produced for the portrait mode to be displayed on the mobile device, the display apparatus may be in the portrait mode. In particular, to implement a mobile mirroring function by which an image displayed on the screen of the mobile device and an image displayed on the screen of the display apparatus are synchronized and displayed, the display apparatus may alternate between the portrait mode and the landscape mode based on the attributes of the content.

In this regard, operation of reproducing content and operation of activating an apparatus function related to the reproduction may be simultaneously carried out in response to an instruction for reproducing the corresponding content. Below, such an embodiment will be described.

Figure 8:
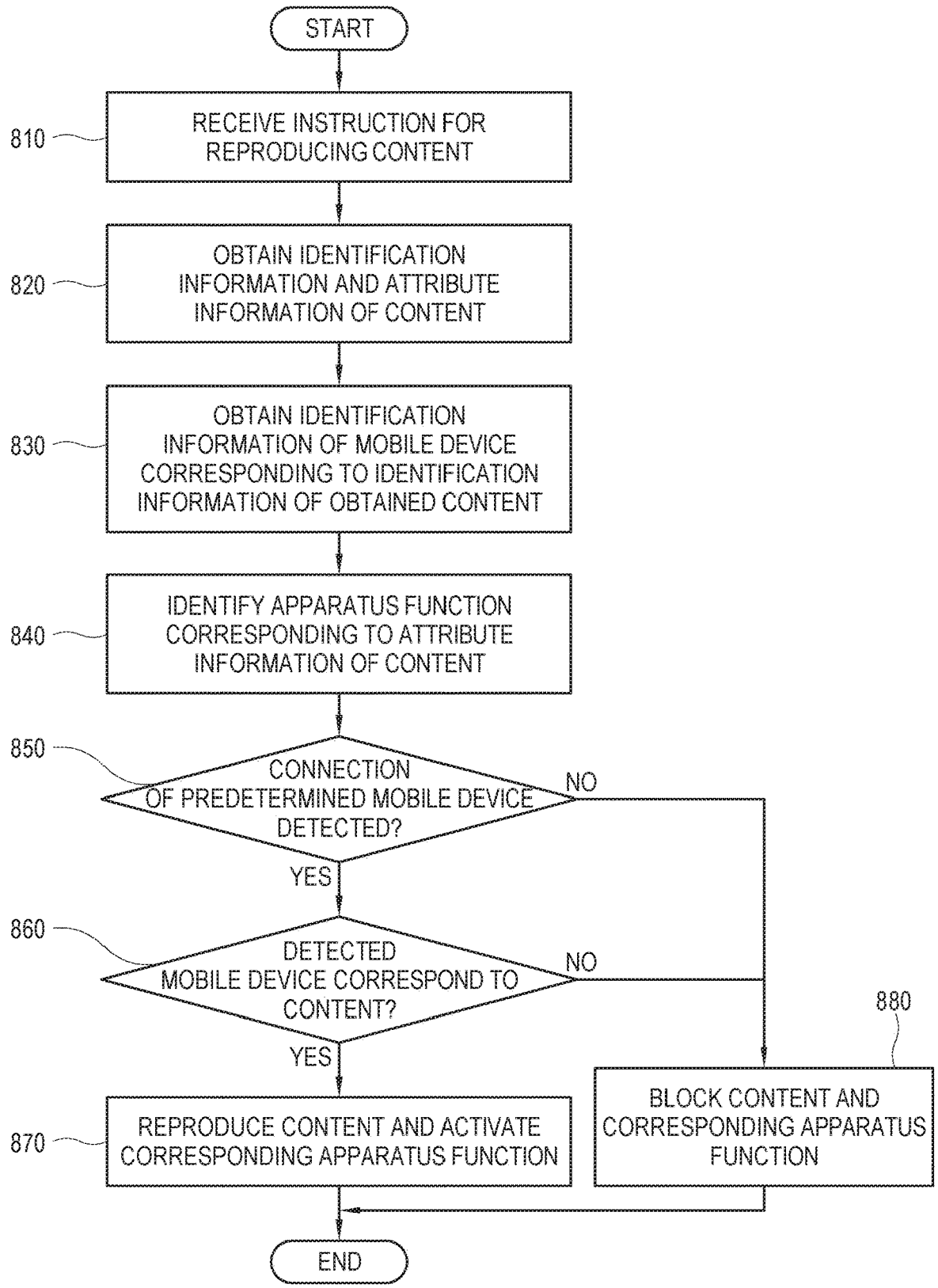
FIG. 8 is a flowchart showing a method of controlling a display apparatus.

FIG. 8 is a flowchart showing a method of controlling a display apparatus.

As shown in FIG. 8, the following operation is performed by the processor of the display apparatus.

At operation 810 the display apparatus receives an instruction for reproducing content.

At operation 820 the display apparatus obtains identification information and attribute information of the corresponding content. The attribute information of the content may be information variously given according to the characteristics of the content, and may be obtained from the metadata of the content. For example, when the content is an image, the attribute information may include various image attributes such as an aspect ratio, resolution, size, frames per second (FPS), format, etc. of the image.

At operation 830 the display apparatus identifies the identification information of the mobile device based on the obtained identification information of the content.

At operation 840 the display apparatus identifies an apparatus function corresponding to the obtained identification information of the content.

At operation 850 the display apparatus identifies whether communication connection with a predetermined mobile device is detected. When it is identified that no mobile devices for the communication connection are detected, the display apparatus enters operation 880.

When the mobile device is detected, at operation 860 the display apparatus identifies whether the detected mobile device matches the corresponding content.

When the detected mobile device is identified as a designated device matching the content desired to be reproduced, at operation 870 the display apparatus reproduces content and activates the apparatus function corresponding to the identified attribute information.

On the other hand, when the detected mobile device is not identified as the designated device matching the content, at operation 880 the display apparatus blocks the reproduction of the content and the activation of the corresponding apparatus function.

For example, suppose that the content is the image and has an attribute of the landscape mode, and the apparatus function corresponding to the attribute information of the content is a function of switching over to the landscape mode. In this case, when the detected mobile device is identified as a device matching the content, the display apparatus reproduces the content and switches over to the landscape mode. On the other hand, when the detected mobile device is not identified as a device matching the content, the display apparatus blocks the reproduction of the content and also prevents the switching over to the landscape mode.

Like this, the display apparatus not only selectively blocks the reproduction of the content according to whether the mobile device matching the identification information of the content is detected, but also selectively blocks the activation of the apparatus function corresponding to the content.

Meanwhile, in the foregoing embodiments, one mobile device is detected with respect to the display apparatus. Alternatively, two or more, i.e. a plurality of mobile devices may be detected with respect to the display apparatus, and the reproduction of the content may be selectively blocked according to whether the mobile device is detected. Below, such an embodiment will be described.

Figure 9:
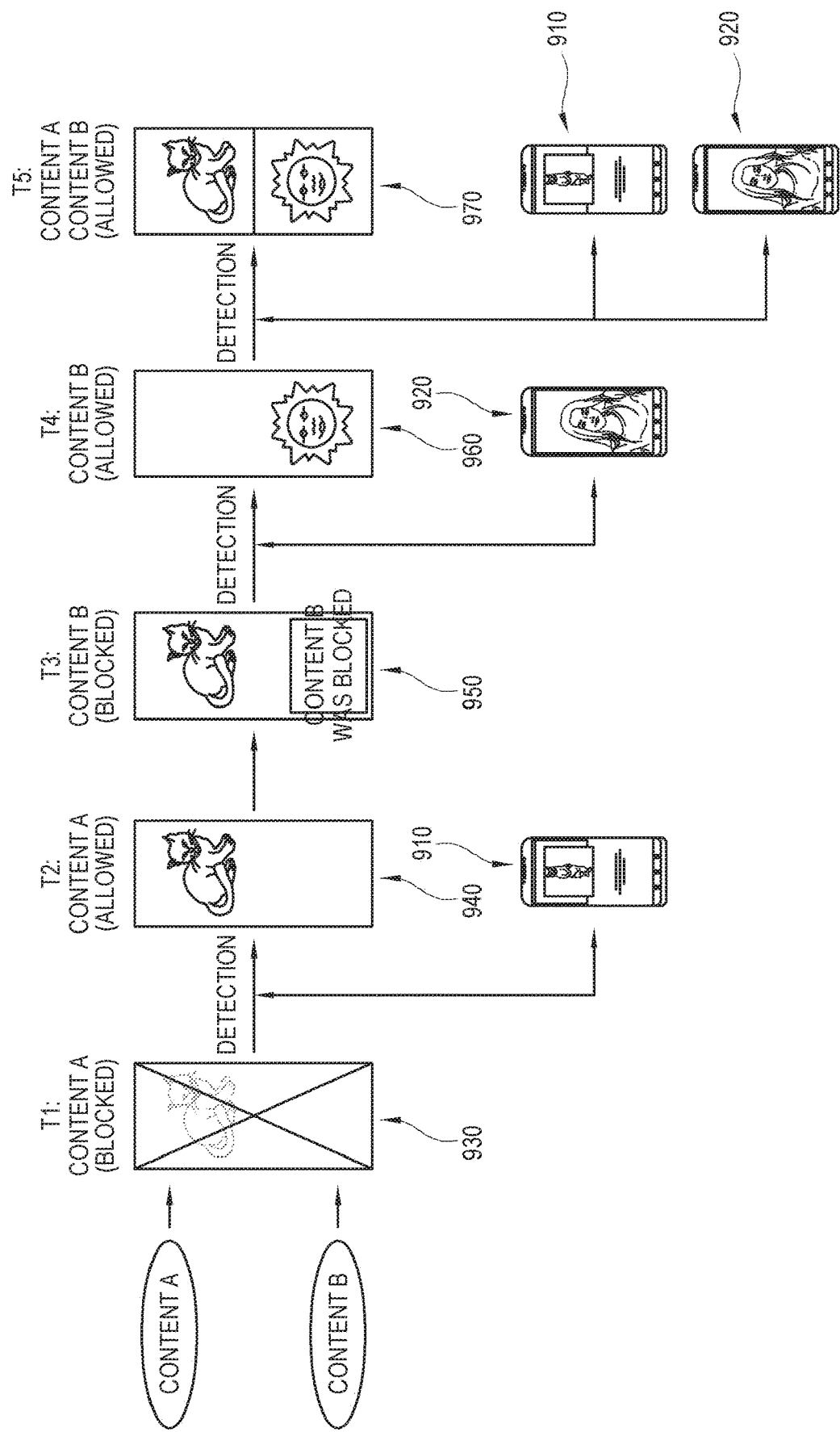
FIG. 9 illustrates an example showing a screen mode of a display apparatus based on a content allowing or blocking condition in relation to a plurality of mobile devices.

FIG. 9 illustrates an example showing a screen mode of a display apparatus based on a content allowing or blocking condition in relation to a plurality of mobile devices.

As shown in FIG. 9, the display apparatus obtains two pieces of content, i.e. content A and content B. The content A is designated for a predetermined first mobile device 910, and the content B is designated for a predetermined second mobile device 920.

When both the first mobile device 910 and the second mobile device 920 are not detected by the display apparatus at a point in time T1, the content A corresponding to the first mobile device 910 and the content B corresponding to the second mobile device 920 are all blocked. When an input to instruct reproduction of the content A is made by a user at the point in time T1, the display apparatus blocks the reproduction of the content A and displays an image 930 with a message or UI informing that the reproduction of the content A is blocked. When an input to instruct reproduction of the content B is made, the display apparatus may block the reproduction of the content B and display an image with a message or UI informing that the reproduction of the content B is blocked.

When an input to instruct the reproduction of the content A is made at a point in time T2 at which the first mobile device 910 is detected but the second mobile device 920 is not detected, the display apparatus reproduces the content A and displays an image 940 based on the content A.

When an input to instruct the reproduction of the content B is made at a point in time T3 at which the first mobile device 910 is detected but the second mobile device 920 is not detected, the display apparatus blocks the reproduction of the content B. When the display of the image based on the content A is continued from the point in time T2, the display apparatus continuously displays the image based on the content A and additionally displays an image 950 with a message or UI informing that the reproduction of the content B is blocked.

When an input to instruct the reproduction of the content B is made at a point in time T4 at which the first mobile device 910 is not detected but the second mobile device 920 is detected, the display apparatus reproduces the content B and displays an image 940 based on the content B.

Like this, the display apparatus allows the reproduction of the content corresponding to the detected mobile device 910 or 920 among a plurality of pieces of content, and blocks the reproduction of the content corresponding to the undetected mobile device 920 or 910. Further, the display apparatus allows reproduction of a plurality of pieces of content while all the mobile devices 910 and 920 are detected. For example, when an instruction to reproduce the content A and the content B is received at a point in time T5, and both the first mobile device 910 and the second mobile device 920 are detected, the display apparatus displays an image 970 including the content A and the content B.

Meanwhile, the display apparatus may be designed to block reproduction of specific content while the plurality of mobile devices 910 and 920 are detected. Below, such an embodiment will be described.

Figure 10:
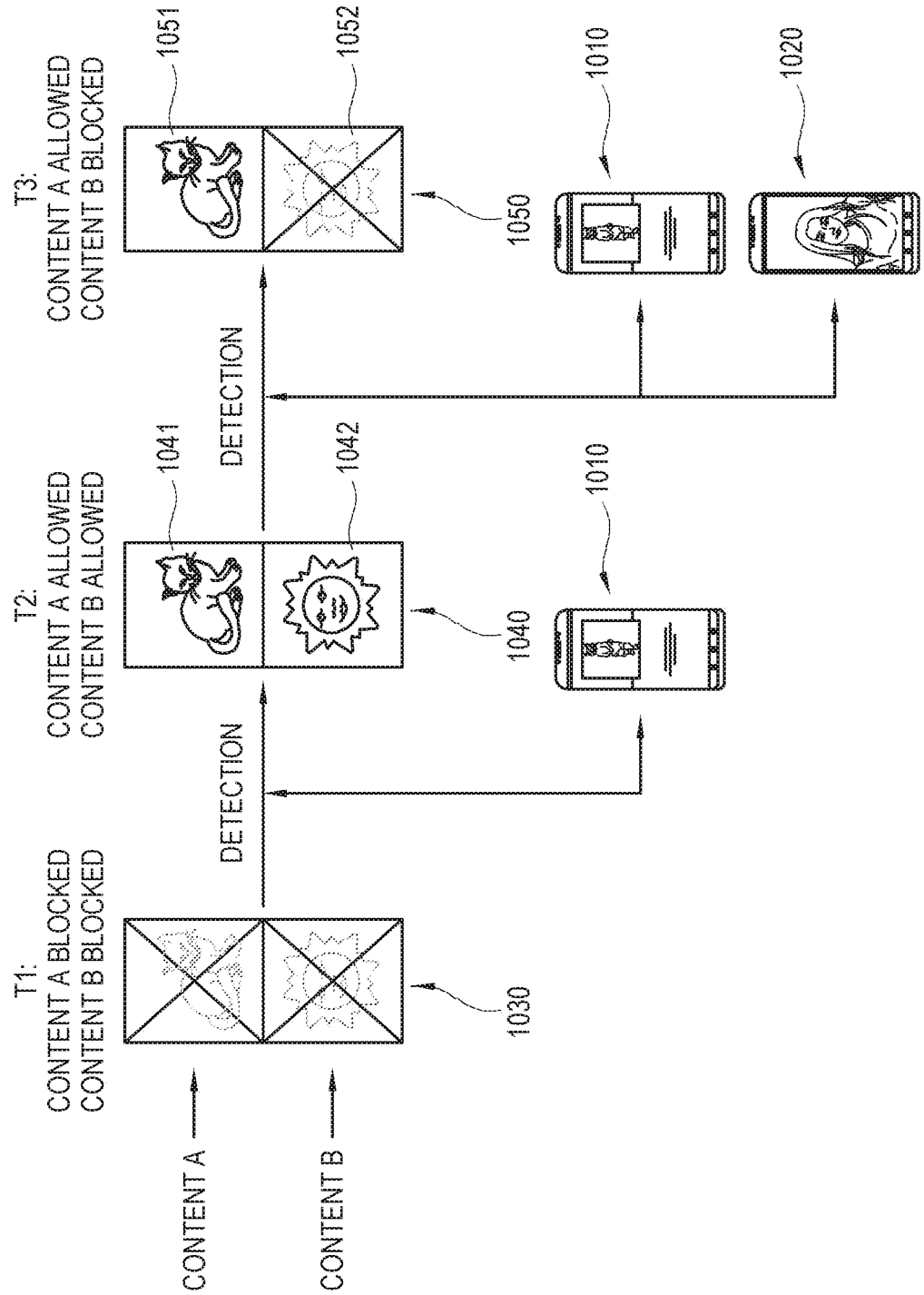
FIG. 10 illustrates an example showing a screen mode of a display apparatus based on a content allowing or blocking condition in relation to a plurality of mobile devices.

FIG. 10 illustrates an example showing a screen mode of a display apparatus based on a content allowing or blocking condition in relation to a plurality of mobile devices.

As shown in FIG. 10, the display apparatus obtains predetermined content, and receives an instruction to reproduce the corresponding content. For example, an instruction to reproduce the content A and the content B may be received at a point in time T1 where any mobile devices 1010 and 1020 are not detected. When it is identified that a first mobile device 1010 is not detected, the display apparatus blocks reproduction of both the content A and the content B, and displays an image 1030 for informing the blocked state. Here, both the content A and the content B are all content designated for the first mobile device 1010.

When an instruction to reproduce the content A and the content B is received at a point in time T2 where the first mobile device 1010 is detected but the second mobile device

1020 is not detected, the display apparatus allows the reproduction of both the content A and the content B designated for the first mobile device 1010, and displays an image 1040 including a content image 1041 based on the reproduction of the content A and a content image 1042 based on the reproduction of the content B.

However, the display apparatus may receive an instruction to reproduce the content A and the content B at a point in time T3 while both the first mobile device 1010 and the second mobile device 1020 are detected. Here, the content B may have a previously designated security level higher than that of the content A, or the content B may be designated with additional settings for content security unlike the content A.

In this case, the display apparatus allows the reproduction of the content A, which has a relatively low security level or is not designated with additional settings, and displays a content image 1051 of the content A. On the other hand, the display apparatus blocks the reproduction of the content B, which has a relatively high security level or is designated with additional settings, and displays an image 1052 informing a blocked state even though the first mobile device 1010 corresponding to the content B is detected because the second mobile device 1020 is separately detected together with the first mobile device 1010. In result, the display apparatus displays an image 1050 including the content image 1051 based on the reproduction of the content A and the image 1052 informing that the content B is blocked.

In the foregoing embodiment of FIG. 9, when both the first mobile device and the second mobile device are detected, the display apparatus allows both the reproduction of the content corresponding to the first mobile device and the reproduction of the content corresponding to the second mobile device. This embodiment is applicable when the security level given from security policy to each piece of content is not relatively high.

On the other hand, in this embodiment, the display apparatus allows reproduction of specific content when only the first mobile device 1010 is detected, but blocks the reproduction of the corresponding content when both the first mobile device 1010 and the second mobile device 1020 are all detected. This embodiment is applicable when the security level of the content is relatively very high. A user may apply such settings as one piece of the identification information to predetermined content through the display apparatus or the mobile device. In other words, the identification information of the content may include an instruction about which one of the above two embodiments will be applied.

In other words, the display apparatus allows the reproduction of the content B when only the first mobile device 1010 corresponding to the content B is detected, and blocks the reproduction of the content B like no detection of any mobile device 1010 and 1020 when both the first mobile device 1010 and the second mobile device 1020 are detected.

Such an embodiment may be applied to the following conditions. When the display apparatus is a TV at home, a user may view the content B of the user's own first mobile device 1010 through the display apparatus. However, a user may not want the user's family to see the content B in terms of privacy protection or security. In this case, the display apparatus blocks the reproduction of the content B and prevents an unintended leakage of the content B when it is identified that another family member is present at home (i.e. when the second mobile device 1020 is detected).

In this embodiment, each of the first mobile device 1010 and the second mobile device 1020 is one device. Alternatively, each of the first mobile device 1010 and the second mobile device 1020 may include a plurality of devices. For example, the first mobile device 1010 may refer to devices that belong to one user having one user account, and the second mobile device 1020 may refer to devices having the other user accounts.

Meanwhile, the display apparatus may not regard some among all the mobile devices detected except the first mobile device 1010 as the second mobile device 1020. For example, the display apparatus may detect all the mobile devices within a range where communication based on common wireless communication standards is possible. When the display apparatus is a TV installed in an apartment house, mobile devices of people, who do not concern a user, as well as the user's family may be present within the communication-allowable range. However, it is meaningless to detect and identify the mobile devices of such people one by one.

Therefore, the display apparatus first identifies whether a detected mobile device is a registered device, based on a list or DB of previously registered mobile devices. The list may be previously input by a user through the display apparatus or the mobile device and stored in the display apparatus. When it is identified that the detected mobile device is not the registered device, the display apparatus ignores the mobile device and does not perform additional operation. On the other hand, when it is identified that the detected mobile device is the registered device, the display apparatus identifies whether the mobile device is the first mobile device 1010 or the second mobile device 1020.

Thus, the display apparatus performs the identification with respect to only a concerned mobile device.

Meanwhile, the display apparatus may store a list of content groups including pieces of content. For example, this list includes a first content group designated to allow sharing by a first user of the first mobile device 1010, a second content group designated to block sharing by the first user, a third content group designated to allow sharing by a second user of the second mobile device 1020, and a fourth content group designated to block sharing by the second user. Here, the allowed sharing means that reproduction of content is allowed in the display apparatus or display of a content image is allowed. The blocked sharing means that the reproduction of content is blocked in the display apparatus or the display of the content image is blocked.

According to this list, the content in the first content group or the third content group is shared to both the first user and the second user. The content in the second content group is shared to the first user, but blocked to the second user. The content in the fourth content group is shared to the second user, but blocked to the first user.

When a predetermined user issues an instruction to display a content list about a plurality of pieces of content, the display apparatus may for example perform the following operation based on the previously stored list.

When the first mobile device 1010 is detected but the second mobile device 1020 is not detected, the display apparatus displays the content list including the first content group and the second content group. On the other hand, the second mobile device 1020 is not detected, and therefore this content list does not include the fourth content group.

When the first mobile device 1010 is not detected but the second mobile device 1020 is detected, the display apparatus displays the content list including the third content group and the fourth content group. On the other hand, the first mobile device 1010 is not detected, and therefore this content list does not include the second content group.

Meanwhile, it will be assumed that the first mobile device 1010 and the second mobile device 1020 are detected. In this case, the display apparatus displays the content list including the first content group and the third content group of which sharing is allowed. The detection of both the first mobile device 1010 and the second mobile device 1020 means that the first user and the second user are watching the display apparatus together.

To prevent the first user from viewing the content of the fourth content group or the second user from viewing the content of the second content group, the display apparatus does not allow the content list of the second content group and the fourth content group be displayed. Alternatively, the display apparatus makes the second content group and the fourth content group be excluded from the displayed content list including the first content group and the third content group.

When a certain piece of content is selected in the displayed content list, the display apparatus displays an image based on the selected content the image.

Meanwhile, in relation to pivoting of the screen of the display apparatus, a configuration of restricting the pivoting of the screen may be further taken into account. Below, such an embodiment will be described.

Figure 11:
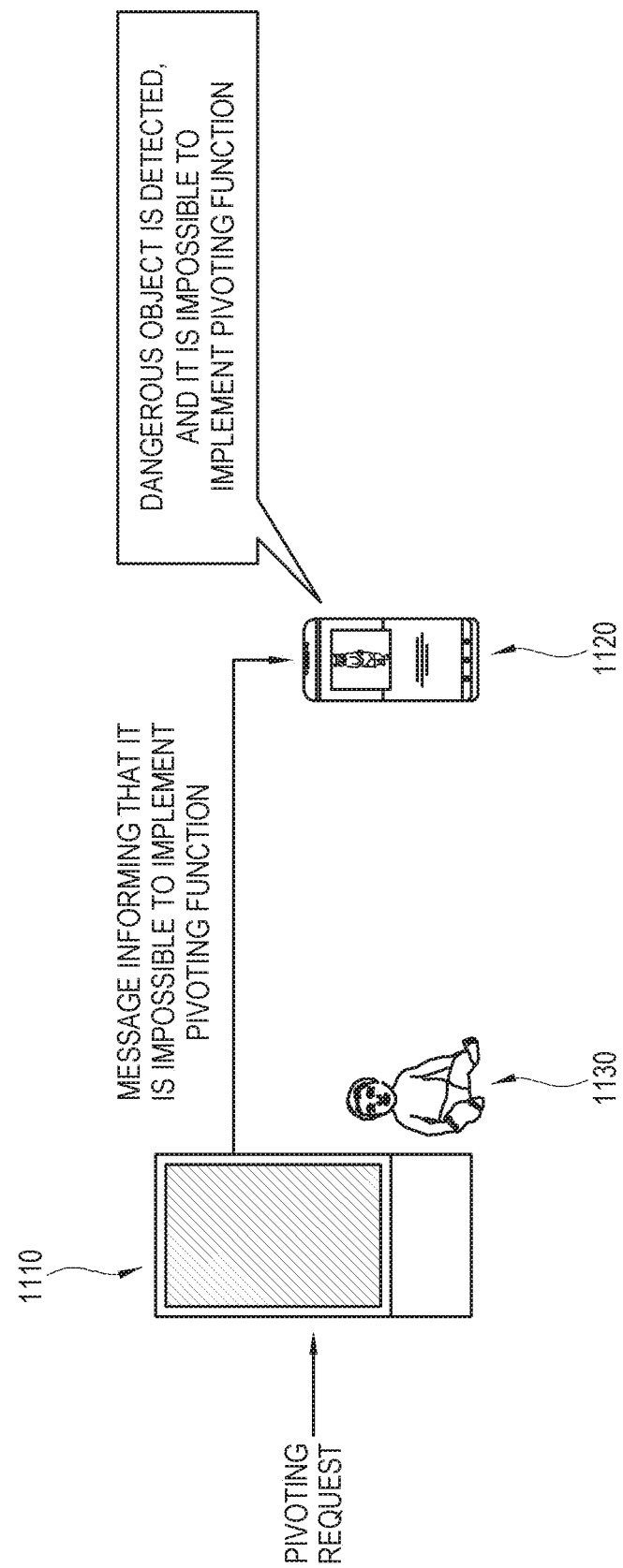
FIG. 11 illustrates an example showing operation of a display apparatus based on a screen pivoting instruction.

FIG. 11 illustrates an example showing operation of a display apparatus based on a screen pivoting instruction.

As shown in FIG. 11, a display apparatus 1110 is provided to pivot a screen and alternate between the portrait mode and the landscape mode in response to a user's input. The screen is pivoted based on operation of the motor provided in the stand of the display apparatus 1110.

In response to a screen pivoting instruction from a user, the display apparatus 1110 identifies whether an object 1130 interfering with the display to be pivoted is present on a pivoting path of the display, before driving the motor to pivot the display. The display apparatus 1110 may include a separate sensor for detecting the object 1130, or may obtain a detection result from the external device capable of detecting the object 1130 under Internet of things (IoT) environments.

When the display apparatus 1110 identifies that the object 1130 interfering with the display to be pivoted is absent, the motor is driven to pivot the display, thereby pivoting the screen.

On the other hand, when the display apparatus 1110 identifies that the object 1130 interfering with the display to be pivoted is present, the motor is not driven and a message of informing that it is impossible to pivot the screen is sent to a mobile device 1120 of a user. Of course, the display apparatus 1110 may display such a message on the screen. However, it is also possible for a user to check the object 1130 as long as the user can check the message on the screen. In other words, this scenario is applied to a case where a user cannot directly check the display apparatus 1110.

Thus, when interference with pivoting the screen is expected, the display apparatus 1110 may inform a user of the interference.

The operations of the apparatus described in the foregoing embodiments may be performed by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the embodiments. The program command recorded in this storage medium may be specially designed and configured according to the embodiments, or may be publicly known and available to those skilled in the art of computer software.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
a display;
a communication circuit configured to communicate with
a first external device and a second external device;

a storage configured to store a list of a first content group designated to allow sharing of content from the first external device to the display by a first user of the first external device, a second content group designed to block sharing of the content from the first external device to the display by the first user, a third content group designated to allow sharing of content from the second external device to the display by a second user of the second external device, and a fourth content group designated to block sharing of the content from the second external device to the display by the second user; and a processor configured to:
process a content list comprising the first content group and the second content group to be displayed on the display based on detection of the first external device and no detection of the second external device through the communication circuit,
process a content list comprising the third content group and the fourth content group to be displayed on the display based on no detection of the first external device and detection of the second external device through the communication circuit, and
process a content list comprising the first content group and the third content group to be displayed on the display and a content list comprising the second content group and the fourth content group not to be displayed on the display, based on detection of both the first external device and the second external device through the communication circuit.

2. The display apparatus according to claim 1, wherein the communication circuit is further configured to detect the first external device and the second external device within a predetermined distance range from the display apparatus, and perform a connection for one-to-one wireless communication with the detected first external device and the detected second external device.

3. The display apparatus according to claim 2, wherein the communication circuit complies with Institute of Electrical and Electronics Engineers (IEEE) 802.15 standards.

4. The display apparatus according to claim 1, wherein the processor is further configured to retrieve a designated state of the content from the list stored in the storage, based on receiving a requesting instruction for a content list.

5. The display apparatus according to claim 4, wherein the processor is further configured to process a message to be displayed on the display to indicate that the content list of the second content group and the fourth content group is not displayed.

6. The display apparatus according to claim 1, wherein the processor is further configured to identify whether the first external device is detected through the communication circuit based on an activation instruction for a predetermined function provided in the display apparatus, and to block activation of the predetermined function based on no detection of the first external device.

7. The display apparatus according to claim 6, wherein the predetermined function comprises pivoting the display.

8. The display apparatus according to claim 1, wherein the processor is further configured to identify a function of the display apparatus corresponding to an attribute of content, and to activate the identified function based on display of an image of the content.

9. The display apparatus according to claim 1, wherein content of the first content group and the second content group is obtained from the first external device, and content of the third content group and the fourth content group is obtained from the second external device.

10. A method of controlling a display apparatus, comprising:
storing a list of a first content group designated to allow sharing of content from a first external device to a display of the display apparatus by a first user of the first external device, a second content group designed to block sharing of the content from the first external device to the display by the first user, a third content group designated to allow sharing of content from a second external device to the display by a second user of the second external device, and a fourth content group designated to block sharing of the content from the second external device to the display by the second user;
displaying, on the display, a content list comprising the first content group and the second content group based on detection of the first external device and no detection of the second external device through a communication circuit of the display apparatus;
displaying, on the display, a content list comprising the third content group and the fourth content group based on no detection of the first external device and detection of the second external device through the communication circuit; and
processing a content list comprising the first content group and the third content group to be displayed on the display and a content list comprising the second content group and the fourth content group not to be displayed on the display, based on detection of both the first external device and the second external device through the communication circuit.

11. The method according to claim 10, wherein the communication circuit is further configured to detect the first external device and the second external device within a predetermined distance range from the display apparatus, and perform a connection for one-to-one wireless communication with the detected first external device and the detected second external device.

12. The method according to claim 11, wherein the communication circuit complies with Institute of Electrical and Electronics Engineers (IEEE) 802.15 standards.

13. The method according to claim 10, further comprising retrieving a designated state of the content from the list stored in the storage, based on receiving a requesting instruction for a content list.

14. The method according to claim 13, further comprising displaying a message on the display to indicate that the content list of the second content group and the fourth content group is not displayed.

15. The method according to claim 10, further comprising identifying whether the first external device is detected through the communication circuit based on an activation instruction for a predetermined function provided in the display apparatus, and blocking activation of the predetermined function based on no detection of the first external device.

16. The method according to claim 15, wherein the predetermined function comprises pivoting the display.

17. The method according to claim 10, further comprising identifying a function of the display apparatus corresponding to an attribute of content, and activating the identified function based on display of an image of the content.

18. The method according to claim 10, wherein content of the first content group and the second content group is obtained from the first external device, and content of the third content group and the fourth content group is obtained from the second external device.

\* \* \* \* \*